United States Patent [19]

Wyler

[11] Patent Number: 5,510,954
[45] Date of Patent: Apr. 23, 1996

[54] SILENT DISK DRIVE ASSEMBLY

[75] Inventor: Gregory T. Wyler, Winchester, Mass.

[73] Assignee: Silent Systems, Inc., Burlington, Mass.

[21] Appl. No.: 246,866

[22] Filed: May 20, 1994

[51] Int. Cl.$^6$ ................................................ H05K 5/00
[52] U.S. Cl. ................... 361/685; 361/687; 360/97.01; 360/97.02
[58] Field of Search ................................. 361/683–690, 361/694, 695, 709; 181/151, 260, 202, 200, 283; 174/16.3

[56] References Cited

U.S. PATENT DOCUMENTS

| | | | |
|---|---|---|---|
| 2,810,842 | 10/1957 | Lewis | 310/27 |
| 3,527,969 | 9/1970 | Papst | 310/51 |
| 3,903,404 | 9/1975 | Beall et al. | 235/152 |
| 4,089,618 | 5/1978 | Patel | 416/228 |
| 4,144,466 | 3/1979 | Hatch | 310/13 |
| 4,216,505 | 8/1980 | Grant et al. | 360/104 |
| 4,408,238 | 10/1983 | Hearn | 360/104 |
| 4,656,533 | 4/1987 | Sakai et al. | 360/65 |
| 4,728,831 | 3/1988 | Cheng | 310/13 |
| 4,751,872 | 6/1988 | Lawson, Jr. | 361/685 |
| 4,807,718 | 2/1989 | Lotz | 181/202 |
| 4,918,561 | 4/1990 | Watanabe et al. | 361/384 |
| 5,000,079 | 3/1991 | Mardis | 98/1 |
| 5,038,308 | 8/1991 | Le et al. | 361/685 |
| 5,052,888 | 10/1991 | Bolton et al. | 415/182.1 |
| 5,129,003 | 7/1992 | Saruta | 381/71 |
| 5,136,464 | 8/1992 | Ohmori | 361/384 |
| 5,186,605 | 2/1993 | Tracy | 415/119 |
| 5,192,183 | 3/1993 | Wilkinson | 415/90 |
| 5,195,576 | 3/1993 | Hatada et al. | 165/80.3 |
| 5,208,730 | 5/1993 | Tracy | 361/384 |
| 5,214,549 | 5/1993 | Baker et al. | 360/97.02 |
| 5,241,436 | 8/1993 | Kawabata et al. | 360/97.01 |
| 5,250,796 | 10/1993 | Taguchi et al. | 250/205 |
| 5,259,726 | 11/1993 | Bacria | 415/119 |
| 5,260,851 | 11/1993 | Chiou | 361/685 |
| 5,262,907 | 11/1993 | Duffy et al. | 360/77.05 |
| 5,262,923 | 11/1993 | Batta et al. | 361/685 |
| 5,287,244 | 2/1994 | Hileman et al. | 361/687 |
| 5,289,342 | 2/1994 | Spalding et al. | 165/46 |
| 5,293,578 | 3/1994 | Nagami et al. | 381/71 |
| 5,297,517 | 3/1994 | Brandt et al. | 123/198 |
| 5,407,330 | 4/1995 | Rimington et al. | 417/312 |

FOREIGN PATENT DOCUMENTS

0564119A2 10/1993 European Pat. Off. .

OTHER PUBLICATIONS

"Variable Air Cooling for Computer and/or Electronic Equipment", *IBM Technical Disclosure Bulletin*, vol. 32, No. 10A Mar. 1990.
"Structural Foam for Computer Equipment Enclosures", *Computer Design*, 8167, vol. 17, No. 10 (1978.10), William Victor and Peter LeBlanc.
"Control of Noise and Vibration with Damping Materials", Ahid D. Nashif, *Sound and Vibration*, Jul. 1983.
*Noise Reduction of Air–Cooled Computer Systems*, Daryl J. Nelson, Floating Point Systems, Inc., Beaverton, Oregon, Sound and Vibration, Dec., 1986.
*A Real World Example of the Effect of Blower Design and Air Flow Management on Computer Noise Emission Levels*, E. A. Wilson, inter–noise, Cambridge, USA, 1986 Jul. 21–13.

Primary Examiner—Leo P. Picard
Assistant Examiner—Jayprakash N. Gandhi
Attorney, Agent, or Firm—Bromberg & Sunstein

[57] ABSTRACT

A computer including an acoustically shielded hard disk drive. Exhaust vents are provided in the computer housing above a convectively cooled power supply. The power supply and, if necessary, a plurality of fans mounted inboard from the intake vents, move the air throughout the computer. The resulting computer produces no more than 25 decibels of noise when in operation. A sound absorption layer surrounds the disk drive assembly. A heat sink mounted exterior to the sound absorption layer is connected by a heat conductive path to the disk drive assembly so as to conduct heat from the disk drive out to the exteriorly mounted heat sink. The disk drive may be immediately surrounded by a fluid containing pouch and a metal bracket.

15 Claims, 4 Drawing Sheets

SILENT DISK DRIVE ASSEMBLY

BACKGROUND OF THE INVENTION

The present invention is directed to a computer, in particular, a computer housed in a typical personal computer housing in which the smallest outer dimension of the housing is the height.

As the computing power of microprocessors has increased, there has been a proliferation of personal computers in the work place. Whereas computing was formerly done by mainframe computers located in a separate computer room, now more and more individual offices are being equipped with their own personal computer. The electronics of a computer generate heat. This is particularly true for the power supply and the disk drives. For proper operation to be maintained, the electronics of a computer must be kept below a threshold temperature at which the electrical performance changes or breaks down. Therefore, a personal computer generally includes a fan for air cooling the components housed within the computer.

Unfortunately, the fan, the disk drives and the power supply produce noise during operation. This noise unnecessarily pollutes the office environment. Noise has been associated with increased levels of stress and other physiological effects. It is an object of the present invention to provide a personal computer that can operate silently.

Another aspect of personal computers is that they are generally cumbersome to service. The components that may need replacing are often not readily accessible. Moreover, computers are generally serviced by handing over the computer itself to the technician. Computers generally hold a memory that may contain personal and sensitive information of the user. It would be highly desirable to enable servicing to proceed without providing the service technician with available access to such personal information. It is a further object of the present invention to provide a computer with an ease of serviceability and a modular design which permits servicing of the computer without handing over the computer's hard disk to the technician.

SUMMARY OF THE INVENTION

In accordance with one embodiment of the invention, a computer includes a hard disk drive, a power supply and a fan. Computer circuit boards are mounted within the housing in communication with the hard disk drive. The hard disk drive is acoustically shielded. In accordance with the present invention the computer produces no more than 25 decibels of sound substantially throughout active operation. The present embodiment leaves the computer inaudible while running.

In accordance with another embodiment of the invention, the computer housing has a height that is smaller than either the width or depth of the housing. Intake vents are located in a side face of the housing. A vertical air barrier is arranged opposite the intake vents and parallel to the side face. A plurality of connectors are arranged on the vertical barrier for receiving and juxtaposing horizontally oriented computer circuit board. A fan may pull the air through the intake vents over the computer circuit boards and into the fan. The computer further includes a hard disk drive and a power supply. The power supply is located at the end of the air path. The power supply generates heat and has side vents and top vents so that air is convectively pulled in through the side vents and out the top vents of the power supply. The power supply with its own convective cooling creates a draft that reduces the need for a louder more powerful fan and in some cases, the need for any fan at all. Exhaust vents are provided in the computer housing disposed above the top vents of the power supply. By locating the fan inboard from the face of the computer housing, any audible noise from the fans is reduced.

In accordance with a further embodiment of the invention, there are a plurality of fans used so that the fans may be run at lower power. This further reduces the noise generated by the fans.

In accordance with still another embodiment of the invention, the vertical air barrier along with its connectors and the computer circuit boards and the fans are all mounted on a removable chassis that can be slid in or out of the housing. Another embodiment of the invention provides a detachable top lid that forms the top face of the computer housing. Removal of the top lid provides easy access to the computer components.

In accordance with another embodiment of the invention, the data storage read-write device or hard disk is sound proofed with a sound absorption layer surrounding the device. A heat sink is mounted exterior of the sound absorption layer. A heat conductive path is provided from the heat sink through the layer so that heat may be conducted away from the data storage device. In accordance with a still further embodiment, the data storage device may be arranged within a fluid containing pouch. A bracket having at least three sides may be arranged to hold the data storage device and the fluid containing pouch therein. The sound absorption layer may be comprised of a sound absorptive porous foam material. The layer may be further comprised of a sandwich of two layers of the porous foam material surrounding an air impervious layer such as a vinyl barrier. An additional sound proofing may be accomplished by surrounding the sound absorption layers with an air-tight plastic enclosure.

The various embodiments of the present invention are generally effective in reducing the noise produced by the computer. The arrangement of the components and construction of the housing also provides for ease of serviceability of the computer. Other objects and advantages of the present invention will become apparent during the following description of the presently preferred embodiments of the invention taken in conjunction with the drawings.

DETAILED DESCRIPTION OF THE PREFERRED EMBODIMENTS

Figure 1:
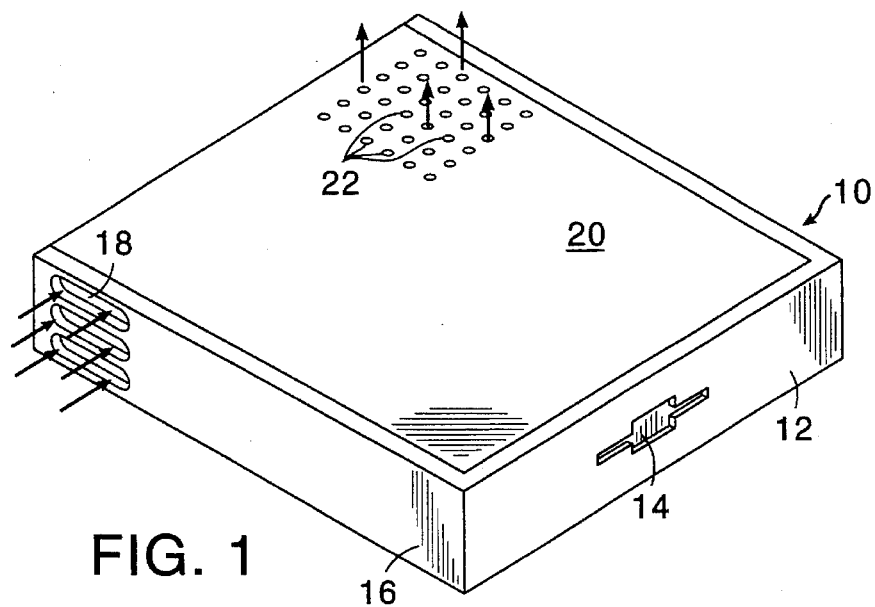
FIG. 1 is an isometric view of an embodiment of the computer of the present invention.

Referring now to the drawings, FIG. 1 shows an embodiment of a computer of the present invention. The computer housing 10 is a relatively flat box in which the height is smaller in dimension than the width or the depth. The dimensions of a presently preferred embodiment of the housing are 4" high, 15" wide and 14.5" deep. The computer housing has a front face 12. The front face may be provided with at least one opening or slot 14 for insertion of a data storage medium such as a floppy disk and/or CDROM. A side face 16 of the computer housing includes a series of intake vents 18. The intake vents 18 in the presently preferred embodiment are located at the rear of the left side face of the computer housing 10. Obviously, the arrangement of the present computer may be reversed from left to right without varying from the objectives or scope of the present invention. Moreover, the air flow achieved within the computer housing may similarly be accomplished by putting the intake vents along the rear panel of the computer. The top face of the computer housing 10 is substantially formed by a removable top lid 20. The top lid 20 may be easily lifted off the computer to provide easy access to all of the computer components. A series of exhaust holes or vents 22 are provided in the rear right-hand portion of the top lid 20. The housing 10 including the top lid 20 are made of one-quarter inch thick acrylic in the presently preferred embodiment. This material and thickness have been found to produce a desired level of noise reduction.

Figure 2:
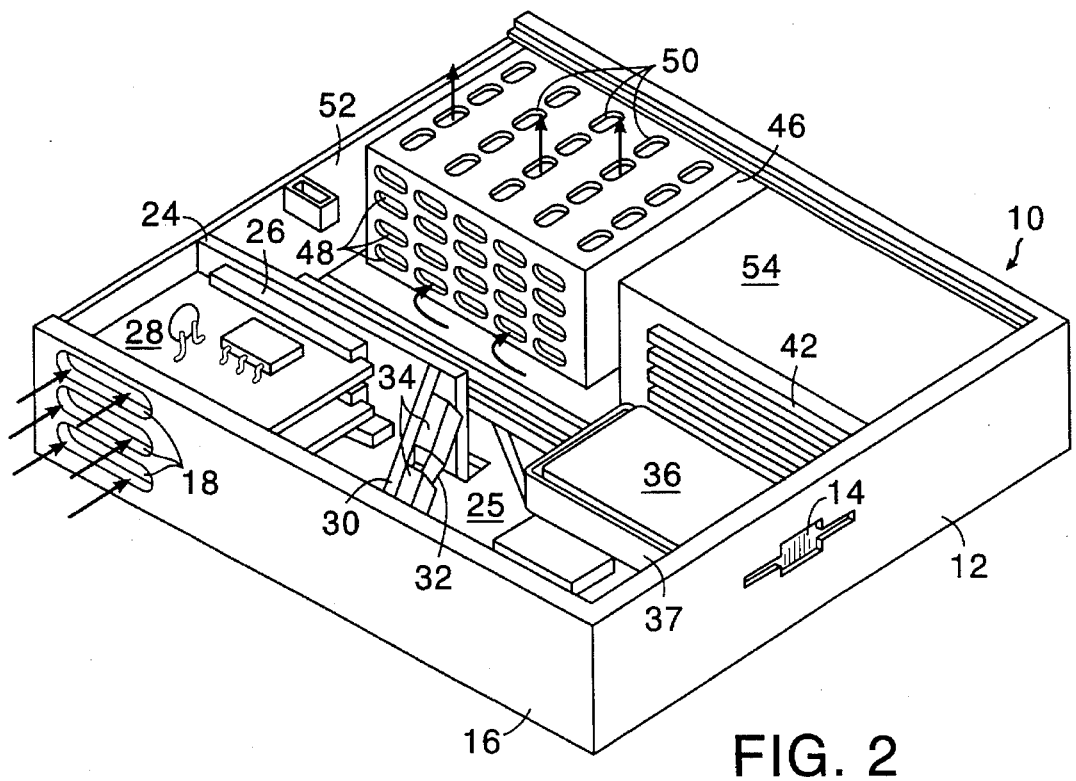
FIG. 2 is an isometric view of the computer of FIG. 1 with the top lid removed.
Figure 3:
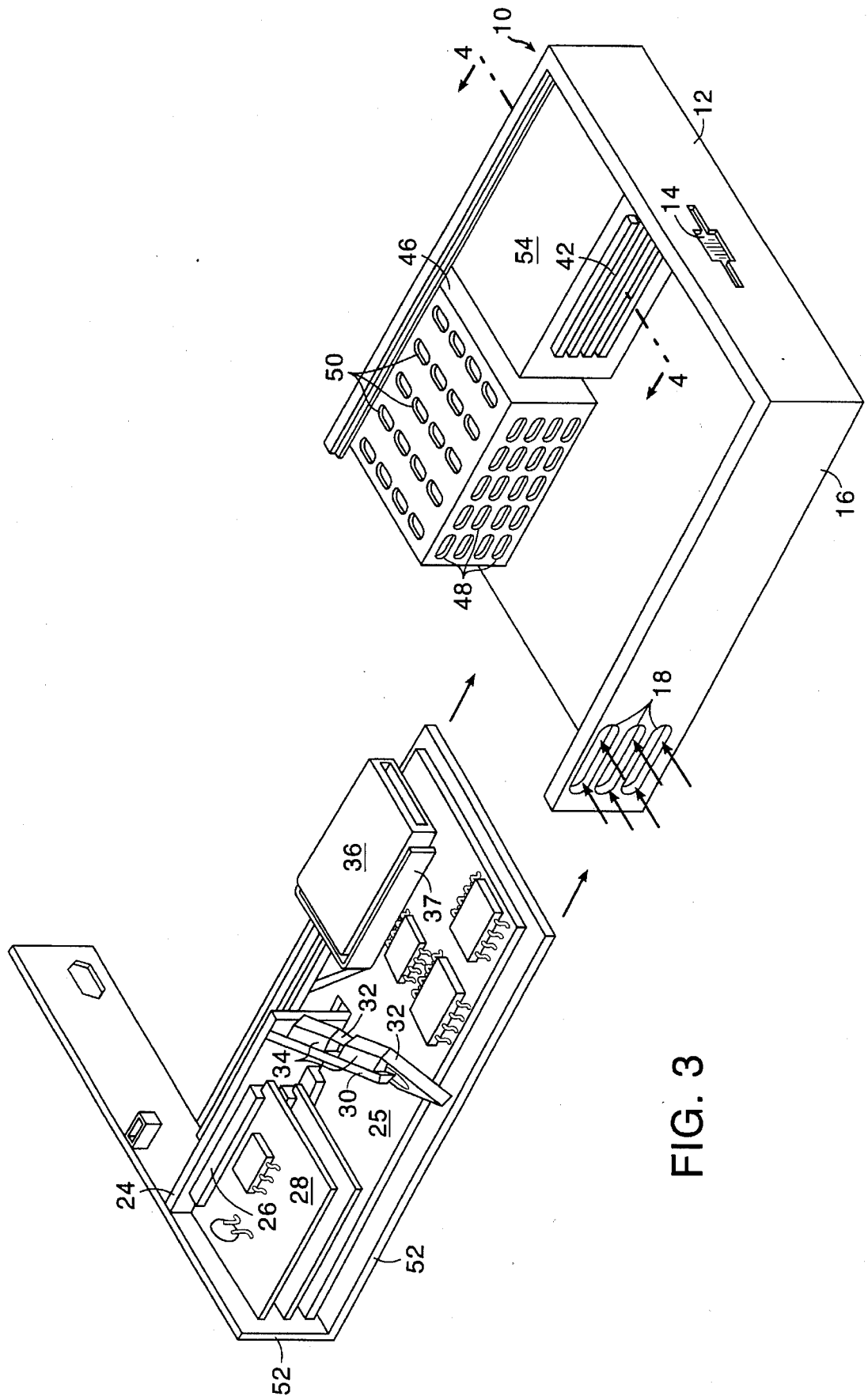
FIG. 3 is an isometric view of the computer of FIG. 2 with the chassis slid out from the housing.

The air flow through the computer housing can be seen in greater detail with respect to FIG. 2. The top lid 20 has been removed to provide a clear view of the air flow path. A vertical air barrier 24 is positioned about a third of the way across the computer away from the side face 16. The vertical air barrier 24 is parallel to the side face 16 and is disposed directly opposite the intake vents 18. The vertical barrier extends from the rear of the computer to about half way towards the front of the computer. The barrier extends vertically all the way up to the top lid 20 so that all air taken in through the intake vents 18 is channelled forward through the inside of the computer housing. The presently preferred vertical barrier 24 is a riser board that plugs into a motherboard 25. The motherboard 25 lies on the floor of roughly the left two-thirds of the computer housing.

A plurality of electrical connectors 26 are mounted on the vertical barrier 24. Each electrical connector 26 is provided for insertion of a computer circuit board 28. The computer circuit boards inserted into the electrical connectors 26 are horizontally oriented within the computer. The connectors are aligned one atop the other so that computer circuit boards inserted in the electrical connectors are juxtaposed one over the other.

At the end of the vertical barrier 24 inboard from the intake vents 18, a frame 30 extends at an angle from the vertical barrier 24 towards the side face 16. The frame 30 is provided for mounting a pair of fans 32 to direct air at an angle toward the inside of the front face and then around behind the vertical barrier 24. In accordance with the presently preferred method for mounting the fans, it is only necessary that the frame 30 extend across the upper portion of the computer. The top edges of the fans are each adhered to a viscoelastic gasket 34. The gasket 34 in turn is adhesively applied to the frame 30. The two fans 32 thus hang down from the frame 30. The fans are tilted downwards on an angle to help guide air down under the floppy disk and above the major heat generating chips on the motherboard 25. In accordance with the presently preferred embodiment, the viscoelastic gasket 34 is made from Sorbothane™ rubber. While a single fan may be used, it is preferred to provide at least two fans. In this manner, each fan can be driven at a lower speed. The presently preferred fans are 12 volt fans with a maximum air delivery of 5.5 cfm. and a maximum noise level of 22.8dB. Each of the 12 volt fans are run at 5.6 volts. The power to the fans 32 is regulated to provide an initial startup voltage of 12 volts and then to fall off to the 5.6 volts for steady state operation. In accordance with the presently preferred embodiment, the fans 32 are model D04F12LWS sold by Rodale Technical Sales of Islip, N.Y. The function of the fans is to pull air in through the intake vents 18 across the circuit boards 28 into the fans and then direct the air down against the motherboard 25 and out at an angle towards the inside of the front face of the computer housing.

A floppy disk drive 36 is mounted in a cradle 37 suspended above the motherboard 25. The cradle 37 is supported by an extension from the frame 30. The air is blown by the fans under the floppy disk drive 36. Any device for writing and reading data to and from a data storage medium may be substituted for the floppy disk drive 36. When the floppy disk drive is accessed to write or read a file, an audible noise may be heard. But such an access occurs relatively infrequently, generally at the beginning or end of a session on the computer. The sound is actually useful in reassuring the user that an instruction is being performed.

The air reverses direction after approaching the front face of the housing by proceeding towards the rear of the computer. This air is in part pushed by the fans 32 and pulled by a draft developed in the power supply 46. The air is pulled through a heat sink 42 mounted on an enclosure 54 in which the hard disk drive 55 of the computer is located. The air is pulled towards the rear of the computer on the side of the vertical barrier 24 opposite that on which the air had initially entered. The air movement may be used to cool the motherboard and any other electronics mounted along the middle of the computer.

It is recommended that the power supply 46 be manufactured using techniques to help minimize any noise generated by the power supply itself. Such techniques includes "potting" the transformers. This involves coating the transformers in the power supply with a plastic coating to reduce noise generated in the transformers. Another technique is to adjust the switching frequency to avoid resonance. Moreover, the power supply 46 should be efficient so that it can be cooled using convection. A less efficient power supply may require additional cooling from fans or the like.

The power supply 46 is housed within a metal housing provided with a series of vents 48 in a side wall for intake of air and a series of top vents 50 so for exhausting air that has been warmed in the power supply. The power supply 46 by itself pulls air through its side vents, warms it so that it leaves through the top vents. The power supply 46 thus acts like a chimney creating a draft. The exhaust vents 22 on the top lid 20 of the computer housing are aligned directly above the top vents of the power supply 46 so that the warmed air is exhausted out of the computer housing.

The power supply 46 is located at the rear of the computer where the power cord may be plugged directly into the power supply. The air path of the present invention therefore flows through the entire computer. Air is moved with the help of the fans 32 and the draft developed in the power supply 46. The air is pulled from the left rear intake vents and is channeled by the vertical barrier 24 toward the front of the computer. The air then winds its way back along the opposite side of the vertical barrier 24 into the power supply and up and out through the exhaust vents 22. The noise generated by the fans 32 is advantageously maintained at a very low level by providing two fans that can thereby be run at lower speeds. Speed can be maintained lower also due to the draft from the power supply 46 which also aids in moving air through the computer. Any noise from these low speed fans is further buffered by the plastic housing 10. Locating the fans inboard from the vents further helps to reduce any noise heard from these fans. The fans themselves are constructed to help minimize the noise that they generate.

The arrangement of the components within the present computer in addition to providing low noise cooling also advantageously provides a modularity that permits ease of serviceability. A metal chassis 52 can be slid in and out of the computer housing 10. The chassis 52 includes a rear panel which closes off the back end of the computer. All components of the computer are mounted on the chassis 52 except for the hard disk drive 55 and the power supply 46. The computer circuit boards, the fans and the floppy disk drive 36 are all mounted on the chassis 52. Repairs and upgrades to a computer can be performed by inspection and testing of the components on the chassis 52 itself. Therefore, the computer of the present invention can be serviced without leaving the hard disk drive containing personal and possibly sensitive information in the hands of the computer repair person. The chassis 52 has a bottom floor that extends over approximately the left two-thirds of the computer housing. The chassis 52 is made of sheet metal. The chassis 52 further provides a suspended cradle into which the floppy disk drive 36 may be securely inserted.

Figure 4:
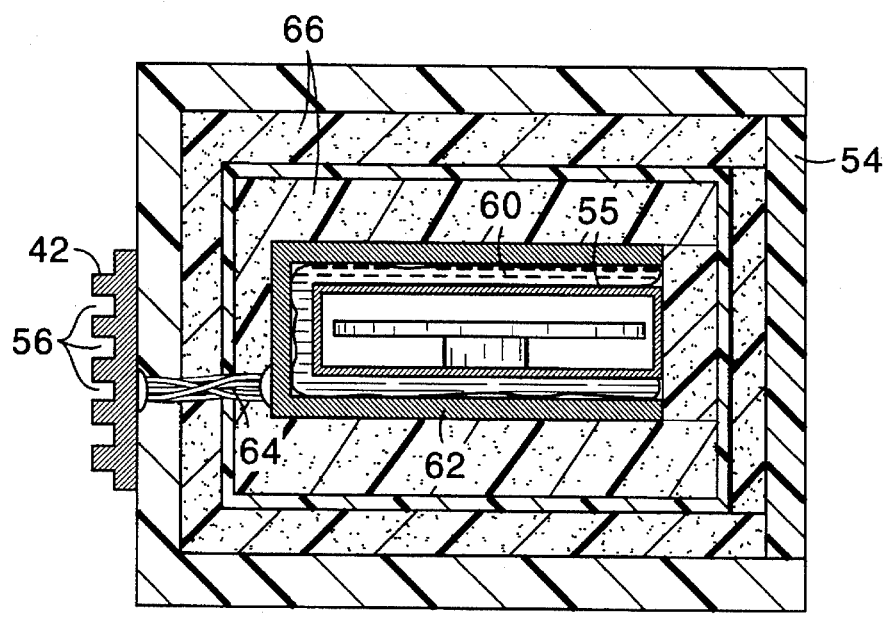
FIG. 4 is a cross-section view of FIG. 4 taken along line 4—4.

Referring now to FIG. 4, the acoustically shielded hard disk drive of the present invention shall be described in greater detail. The sound proofing technique of the present invention may be used with any heat generating electronic equipment without exposed moving parts. The hard disk drive 55 is enveloped within a sound proofing material 66. At the outside of the package is an acrylic housing 54. The presently preferred acrylic housing 54 is one-eighth inch in thickness. The housing 54 should be flexible enough to avoid noise-generating vibrations. The housing 54 is preferably air-tight to minimize the passage of sound from within. The housing 54 is provided with a removable wall or door that allows access to the hard disk drive 55. The presently preferred housing 54 is 3.48 inches high, 5.25 inches wide and 7.5 inches long. The electric cables connected to the hard disk drive may be passed through a hole in the acrylic housing which may then be sealed with a sealant such as silicone. The electronic cables provide electrical communication between the hard disk drive and the other components of the computer. Mounted on the outside of the acrylic housing is a heat sink 42. The heat sink is a heat conductive material such as metal. The presently preferred metal is aluminum. The heat sink is formed with a series of horizontal channels 56. The channels provide additional surface area for air cooling of the heat sink 42.

Figure 5:
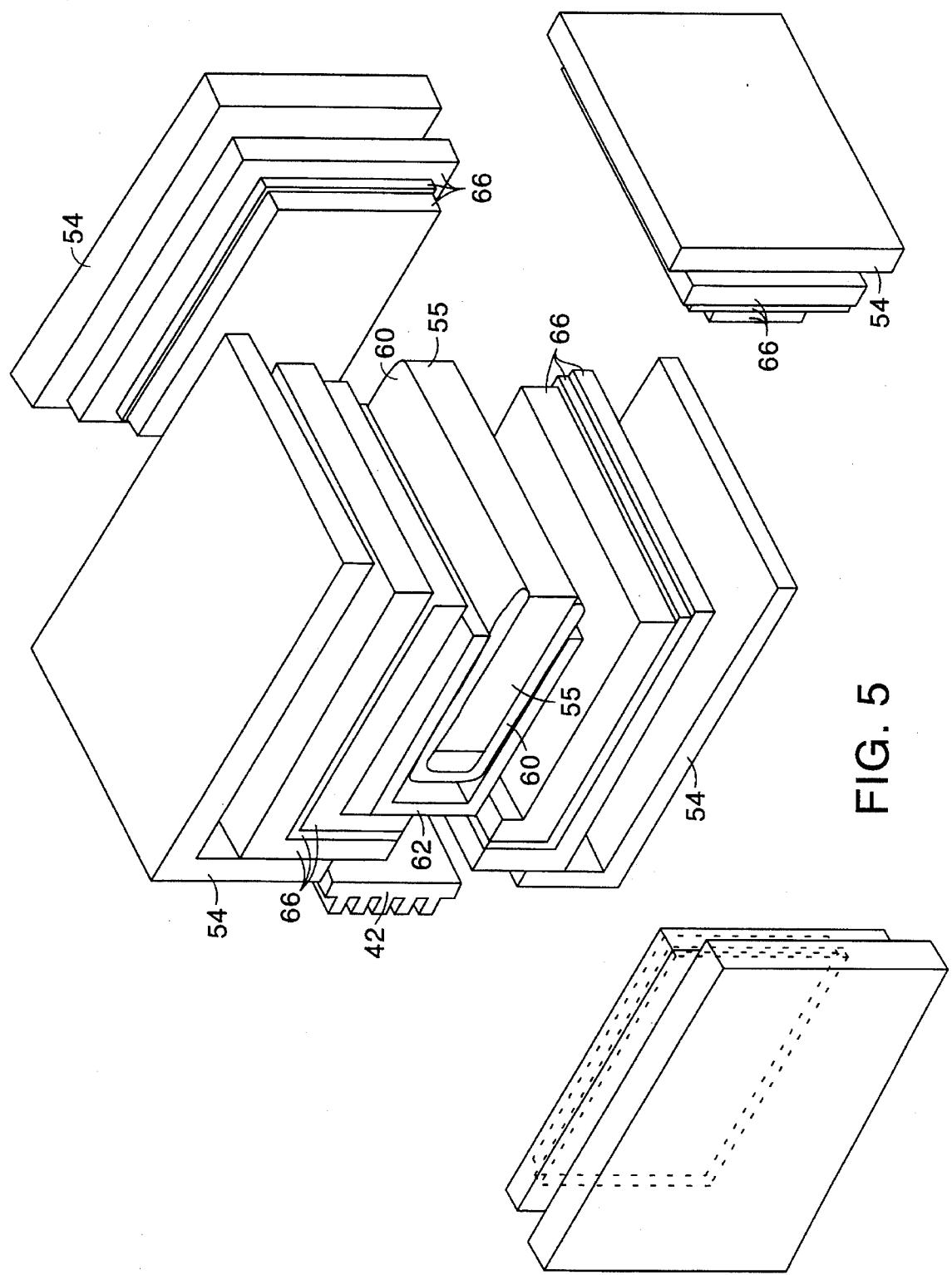
FIG. 5 is an exploded view of the acoustically shielded hard disk of FIG. 4.

The arrangement of the sound proofing materials can be seen in greater detail with respects to FIG. 5. At the center of the block is the hard disk drive 55. The hard disk drive 55 is preferably oriented with its circuit board on top. This is generally an upside-down configuration for mounting the hard disk drive. It has been found that the circuit board itself provides some sound reduction that can be taken advantage of by using this upside-down configuration. Moreover, those hard disk drives having all components mounted between the circuit board and disk drive case rather than on the outside of the outer circuit board have been generally found to be quieter running.

A first layer of cooling and sound reduction is provided by a fluid containing pouch 60. The pouch material is flexible, durable and heat conductive. The fluid containing pouch advantageously damps any vibrations of the outer casing of the hard disk drive. The presently preferred fluid containing pouch is the FC-3261 Fluorinert™ liquid heat sink manufactured and supplied by the 3M Company of St. Paul, Minn. The invention uniquely uses the liquid heat sink for sound reduction and vibration damping in addition to its known function as a heat sink. An additional layer of cooling and sound reduction is provided by a metal bracket 62 that acts as a cold plate. The metal bracket has at least three sides, two of which cover the major surface areas of the hard disk drive 55. The metal bracket 62 fits over the fluid containing pouch 60 and the hard disk drive 55 forming a convenient pocket that is both sound reduced and heat sinked. The presently preferred bracket 62 has two opposing surfaces that are 4 ¾inches by 4 ¼inches. The third surface is perpendicular to the other two and connects an edge of each of the opposing surfaces to each other. The third surface separates the other two surfaces by 1 ⅛inches.

A conductive heat path is provided from the heat sink 56 to the hard disk drive to permit heat to pass from the hard disk drive out to the heat sink. The conductive path is provided by a copper braiding 64 that is connected at one end to the heat sink 42 and at the other to the metal bracket 62. The metal bracket 62 and the fluid containing pouch 60 complete the path to the hard disk drive 58. The heat conductive path may be formed in a number of alternate ways. Instead of the copper braiding, the heat conductive path can be provided by a liquid cooling system in which the liquid would flow out to a radiator for cooling and then back in to the middle of the soundproofed disk drive package. Another alternative is to use thermoelectric heat pumps which transfer the heat to a path going outside the case that can be used to improve heat transfer efficiency.

Sound absorption material 66 surrounds the hard disk drive and the fluid containing pouch and metal bracket. The presently preferred sound absorbent material is a barrier foam. The more particularly preferred sound absorbent layer is provided by EAR R803-010-25-100PSA or R403-010-25-050PSA material manufactured by EAR of Indianapolis, Ind. This material consists of two foam layers sandwiched about a vinyl air impervious barrier. A larger one of the two foam layers is arranged so as to be interior of the vinyl barrier and thus closer to the hard disk drive. A metal foil layer is adhered to the exterior of the larger one of the foam layers. This metal foil layer is oriented against the metal casing in the presently preferred embodiment.

The presently preferred embodiment provides several solid barriers to the noise generated by the hard disk drive. The first layer is the hard disk drive itself and its own circuit board. The fluid containing pouch provides another layer. The metal casing provides a third layer. The vinyl barrier provides a fourth layer and the air-tight acrylic enclosure 54 provides a fifth layer. Finally, the computer housing 10 itself provides an additional layer of sound barrier. As a result, it has been found that the computer of the presently preferred embodiment generally operates at a noise level of less than 25 decibels. This constitutes effective silence since the human ear cannot generally discriminate between sounds below this level. When the floppy drive or the hard drive is accessed, there may be audible sounds assuring the user that an instruction is being performed, however for the remaining time which amounts to substantially the whole time the computer is on, active operation of the computer results in no sound. The fans, the power supply and the actively rotating hard disk are not audible in accordance with the preferred embodiment of the invention.

Figure 6:
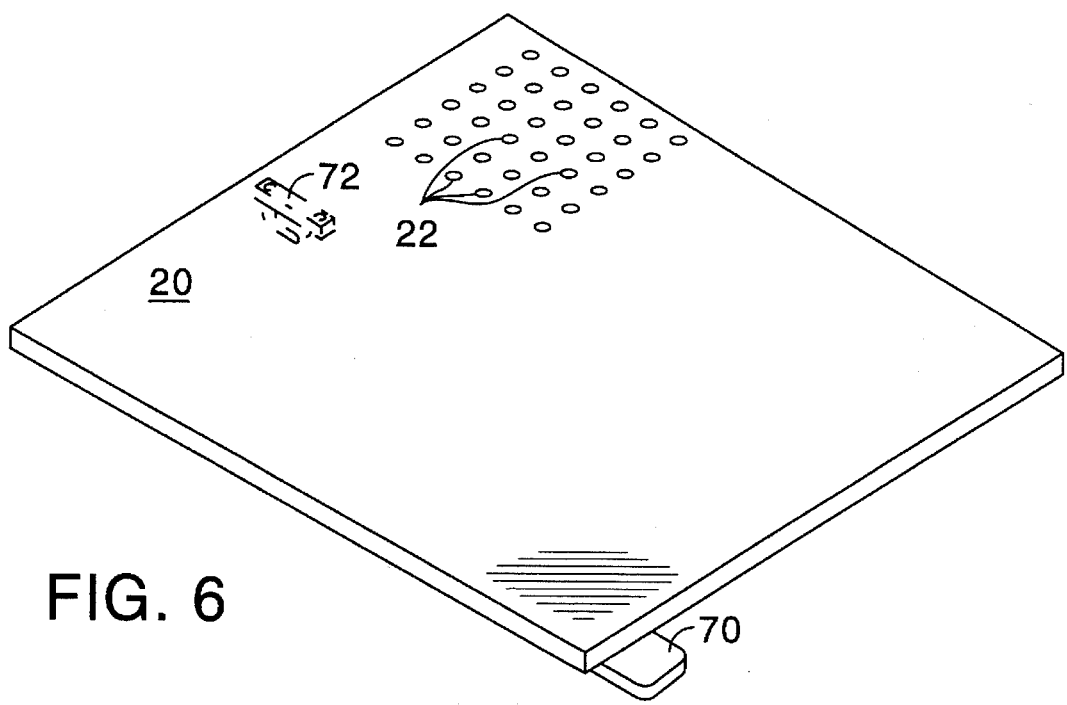
FIG. 6 is an isometric view of the top lid of the computer housing of the embodiment of FIG. 1.

The removable lid 20 is shown in FIG. 6. The top lid 20 of the invention provides for easy access to the computer components so that any damaged component can be easily replaced without time consuming disassembly of the computer. The lid is provided with a tab 70 for insertion beneath the front edge of the computer housing 10. The lid 20 itself rests on top of horizontal rails formed along the edges of the housing 10. At the rear of the lid 20, a hook 72 is provided. Along the rear wall of the chassis 52, a receiving catch is mounted. Thus when the lid is closed, the hook 72 engages the catch. The tab 70 and the door catch adequately hold the lid on the housing. A presently preferred door catch is the Grabber™ door catch made by Southco, Inc. Any of a number of conventional latch mechanisms may be used to secure the lid 20 to the computer housing 10.

Of course, it should be understood that various changes and modifications to the preferred embodiments described above will be apparent to those skilled in the art. For example, an acoustically shielded heat sinked hard disk drive may be used in computers of any construction. The particular arrangement of components may be varied and yet still achieve the objectives of sharing the air moving responsibility between a convectively cooled power supply and a plurality of fans. Such changes and modifications can be made without departing from the spirit and the scope of the invention and without diminishing its attendant advantages. It is therefore intended that such changes and modifications be covered by the following claims.

I claim:

1. In a computer having a data storage read/write device, the improvement comprising:

a sound absorption layer surrounding said data storage read/write device;

a heat sink mounted exterior of said sound absorption layer; and a heat conductive path from said heat sink through said sound absorption layer so as to conduct heat from said data storage read/write device to said heat sink.

2. The computer of claim 1 further comprising a fluid-containing pouch arranged about said data storage read/write device.

3. The computer of claim 2 further comprising a metal casing having at least three sides arranged to hold said data storage read/write device and said fluid-containing pouch therein.

4. The computer of claim 3 wherein said sound absorption layer comprises a layer of sound absorptive porous foam material surrounding said metal bracket.

5. The computer of claim 3 wherein said heat conductive path is formed by a metal cable connected to said heat sink inserted through said sound absorption layer and connected to said metal bracket.

6. The computer of claim 1 further comprising an airtight enclosure surrounding said sound absorption layer and wherein said heat sink is mounted on the exterior of said airtight enclosure.

7. The computer of claim 6 wherein said sound absorption layer comprises a composite formed by two layers of sound absorptive porous foam material sandwiched about a fluid impervious barrier layer.

8. A silent disk drive comprising:

a disk drive assembly;

a sound absorption layer surrounding said disk drive assembly;

a heat sink mounted exterior of said sound absorption layer; and a heat conductive path from said heat sink through said sound absorption layer so as to conduct heat from said disk drive assembly to said heat sink.

9. The disk drive of claim 8 further comprising a fluid-containing pouch arranged about said disk drive assembly.

10. The disk drive of claim 9 further comprising a metal bracket having at least three sides arranged to hold said disk drive assembly and said fluid-containing pouch therein.

11. The disk drive of claim 10 wherein said sound absorption layer comprises a layer of sound absorptive porous foam material surrounding said metal bracket.

12. The disk drive of claim 11 further comprising a layer of metal foil adhered to said layer of sound absorptive foam material and positioned adjacent said metal bracket.

13. The disk drive of claim 10 wherein said heat conductive path is formed by a metal cable connected to said heat sink inserted through said sound absorption layer and connected to said metal bracket.

14. The disk drive of claim 8 further comprising an airtight enclosure surrounding said sound absorption layer and wherein said heat sink is mounted on the exterior of said airtight enclosure.

15. The disk drive of claim 8 wherein said sound absorption layer comprises a composite formed by two layers of sound absorptive porous foam material sandwiched about a fluid impervious barrier layer.

* * * * *